(12) United States Patent
Yamamoto

(10) Patent No.: US 9,140,318 B2
(45) Date of Patent: Sep. 22, 2015

(54) ONE WAY CLUTCH

(75) Inventor: Norihiro Yamamoto, Fukuroi (JP)

(73) Assignee: NSk-Warner K.K., Tokyo (JP)

( * ) Notice: Subject to any disclaimer, the term of this patent is extended or adjusted under 35 U.S.C. 154(b) by 1316 days.

(21) Appl. No.: 12/545,845

(22) Filed: Aug. 23, 2009

(65) Prior Publication Data

US 2010/0051402 A1    Mar. 4, 2010

(30) Foreign Application Priority Data

Aug. 26, 2008  (JP) ................... 2008-216930
May 8, 2009   (JP) ................... 2009-113854

(51) Int. Cl.
  *F16D 41/067*  (2006.01)
  *F16D 41/066*  (2006.01)
(52) U.S. Cl.
  CPC ............ *F16D 41/066* (2013.01); *F16D 41/067* (2013.01)
(58) Field of Classification Search
  CPC .................................................... F16D 41/067
  USPC ............. 192/45.019, 45.016, 45.006, 45.008, 192/45.011, 45.012, 45.014, 45.015
  See application file for complete search history.

(56) References Cited

U.S. PATENT DOCUMENTS 2,892,522 A *  6/1959  Moo ................... 192/45.008
  5,695,031 A * 12/1997  Kurita et al. ......... 192/45.013
2005/0000773 A1* 1/2005  Shirataki et al. ............. 192/45

FOREIGN PATENT DOCUMENTS

JP   02-088034 U   7/1990
JP   09-014301     1/1997
JP   2001-059530 A 3/2001
JP   2006-002925 A 1/2006

OTHER PUBLICATIONS

Office Action issed Feb. 5, 2013, in Japanese Patent Application No. 2009-113854.

* cited by examiner

*Primary Examiner* — Robert Hodge
*Assistant Examiner* — Terry Chau
(74) *Attorney, Agent, or Firm* — Miles & Stockbridge P.C.

(57) ABSTRACT

One way clutch has an inner ring, an outer ring and torque transmission members between the inner ring and the outer ring. Each torque transmission member can shift between a torque transmission position and a non torque transmission position. The one way clutch further has biasing members that bias the torque transmission members respectively toward the torque transmission positions, and a retainer that retains the torque transmission members and the biasing members. The retainer includes first and second mount portions that retain the torque transmission members and the biasing members corresponding thereto. Each of the first and second mount portions has a securing portion that secures one end of the biasing member, and the torque transmission member is pressed by the other end of the biasing member. The biasing force that the biasing members retained by the second mount portions exert on the torque transmission members corresponding thereto is larger than the biasing force that the biasing members retained by the first mount portions exert on the torque transmission members corresponding thereto.

6 Claims, 8 Drawing Sheets

ONE WAY CLUTCH

This application claims the benefit of Japanese Patent Applications No. 2008-216930 and No. 2009-113854 which are hereby incorporated by reference.

FIELD OF THE INVENTION

The present invention relates to a one way clutch that can be suitably used particularly in an automatic transmission of an automobile.

RELATED BACKGROUND ART

An automatic transmission for an automobile is typically equipped with a two to five speeds planetary gear transmission mechanism in addition to a torque converter in the form of a fluid coupling, and gear change is performed by appropriately fixing and releasing a sun gear and planetary gears etc. in the planetary gear transmission mechanism by frictional engagement means such as a clutch or a brake. In some cases, the frictional engagement means internally built in the automatic transmission is internally equipped with a one way clutch to allow free rotation of the gear shaft etc. in one rotational direction, to thereby facilitate gear shift control.

This type of one way clutch includes an inner ring, an outer ring disposed coaxially with the inner ring, a plurality of cam surfaces provided along the circumferential direction on the inner circumferential surface of the outer ring or the outer circumferential surface of the inner ring, each including a recessed portion and a slope, torque transmission members provided between the outer circumferential surface of the inner ring and the aforementioned cam surfaces, biasing members that bias the respective torque transmission members against the aforementioned slopes of the cam surfaces, and a retainer attached on the outer ring to retain the torque transmission members and the biasing members, as described, for example, in Japanese Patent Application Laid-Open No. 2001-59530.

In this structure, the biasing member biases the torque transmission member against the slope of the cam surface. While in one rotational direction the torque transmission member acts integrally with the inner ring and the outer ring to transmit torque, in the reverse rotational direction the torque transmission member compresses the biasing member and is received in the recessed portion of the cam surface to allow relative rotation of the inner ring and the outer ring, whereby the driving ring, whether the inner ring or the outer ring, rotates freely so that no torque is transmitted.

Upon transition from free or idle rotating of the inner ring to torque transmission, in other words, upon transition from the disengaged state to the engaged state, it is necessary for the oil film between the torque transmission member and the contact potions of the inner ring and the outer ring to be broken so that direct contact of the metal parts is achieved.

However, in the case of the above described prior art structure, if the one way clutch is used in a very low temperature (e.g. $-20°$ C. to $-40°$ C.) environment in which lubricant oil or automatic transmission fluid (ATF) used in the automatic transmission has a high viscosity, the torque transmission member cannot break through the oil film on the contact portions of the inner and outer rings at the time when engagement with the inner and outer rings is to be achieved. Thus, there may be cases where normal engagement is not achieved, and the torque transmission member continuously slides on the oil (ATF) having a high viscosity.

To avoid such sliding in a very low temperature environment, in the roller type one way clutch disclosed in Japanese Patent Application Laid-Open No. 2006-2925, the sliding surface of the roller is designed to have a concave portion that is recessed with respect to the axial direction along its entire circumference, whereby breaking of the oil film at the moment of transition from free or idle rotation to the start of engagement in the early stage of engagement is facilitated, and metal parts can easily come in contact with each other. By causing the initial contact of the metal parts in this way, the engagement performance in a low temperature environment is enhanced.

As another countermeasure to the sliding in a very low temperature environment, a stronger biasing force may be exerted on the torque transmission member to increase the pressure on the contact surface between the torque transmission member and the cam surface or the contact surface between the torque transmission member and the track surface, to thereby facilitate breaking of the oil film. In this case, however, a dragging torque during idle rotation is also increased, which lead to other problems, such as promotion of abrasion of the torque transmission member and the inner or outer ring and a decrease in the efficiency of the automatic transmission.

SUMMARY OF THE INVENTION

The present invention has been made in view of the above situations and has as an object to provide a one way clutch in which engagement of torque transmission members with an inner ring and an outer ring can be achieved as needed even in a low temperature environment.

To achieve the above object, a one way clutch according to a first aspect of the present invention comprises:

an inner ring;

an outer ring disposed coaxially with said inner ring;

a plurality of torque transmission members provided between an outer circumferential surface of said inner ring and an inner circumferential surface of said outer ring, said torque transmission members being capable of shifting between respective torque transmission positions at which the torque transmission members engage with the outer circumferential surface of said inner ring and the inner circumferential surface of said outer ring and respective non torque transmission positions at which the torque transmission members do not engage with the outer circumferential surface of said inner ring or the inner circumferential surface of said outer ring;

a plurality of biasing members that bias said torque transmission members respectively toward the torque-transmission positions; and a retainer that retains said torque transmission members and said biasing members, wherein said retainer includes first and second mount portions that retain said torque transmission members and said biasing members corresponding thereto;

each of said first and second mount portions has a securing portion that secures one end of said biasing member, said torque transmission member being pressed by the other end of said biasing member; and a biasing force with which the biasing members retained by said second mount portions bias the torque transmission members corresponding thereto is set to be larger than a biasing force with which the biasing members retained by said first mount portions bias the torque transmission members corresponding thereto.

According to a second aspect of the present invention, in the one way clutch according to the first aspect of the invention, a plurality of concave cams each including a recessed portion and a slope are provided on either one of the outer circumferential surface of said inner ring and the inner circumferential surface of said outer ring along a circumferential direction, a cylindrical surface is provided on the other of the outer circumferential surface of said inner ring and the inner circumferential surface of said outer ring, said plurality of torque transmission members are provided respectively between said plurality of concave cams and said cylindrical surface, said biasing members bias said torque transmission members respectively toward said slopes in said concave cams, and said torque transmission members roll in said concave cams against the biasing force of said biasing members only when said inner ring and said outer ring rotate in one direction to transmit torque between said inner ring and said outer ring.

According to a third aspect of the present invention, in the one way clutch according to the first or second aspect of the present invention, said biasing members that are retained by said first mount portions are first compression springs having a certain spring constant, and said biasing members that are retained by said second mount portions are second compression springs having a spring constant larger than that of said first compression springs.

According to a fourth aspect of the present invention, in the one way clutch according to the first or second aspect of the invention, the distance between said securing portion and said torque transmission member that is in the torque transmission position in said first mount portions is set to be larger than the distance between said securing portion and said torque transmission member that is in the torque transmission position in said second mount portions, and said biasing members are compression springs having the same spring constant.

According to a fifth aspect of the present invention, in the one way clutch according to any one of the first to fourth aspects of the invention, said second mount portions are arranged respectively at every predetermined number of said first mount portions.

According to the sixth aspect of the present invention, in the one way clutch according to any one of the first to fifth aspects of the invention, said second mount portions are arranged along the circumferential direction at certain regular angular intervals.

The present invention can provide a one way clutch in which engagement of torque transmission members with an inner ring and an outer ring can be achieved as needed even in a very low temperature environment without an increase in the dragging torque during idle rotation.

DESCRIPTION OF THE PREFERRED EMBODIMENTS

In the following, embodiments of the one way clutch according to the present invention will be described with reference to the drawings.

First Embodiment

Figure 1:
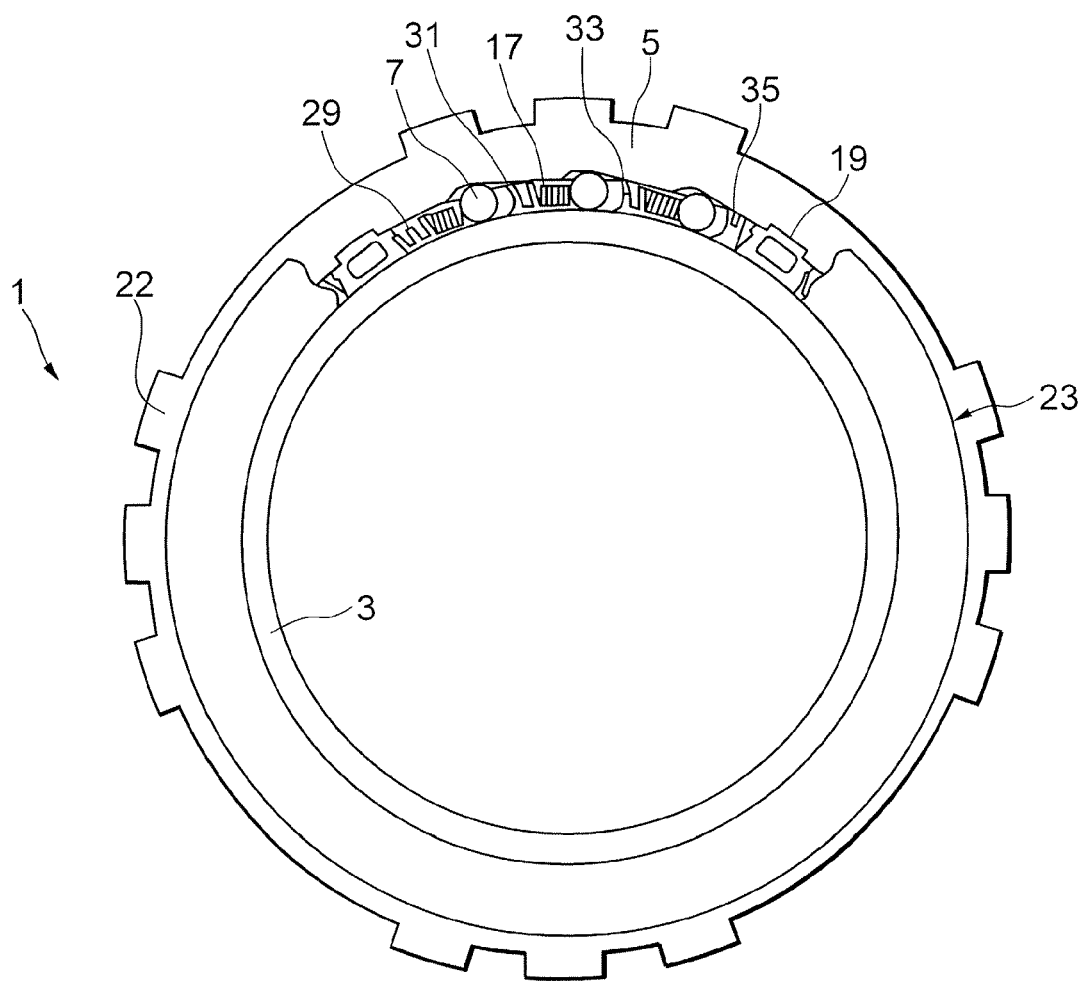
FIG. 1 is a partly cut-away front view of a one way clutch according to a first embodiment of the present invention.
Figure 2:
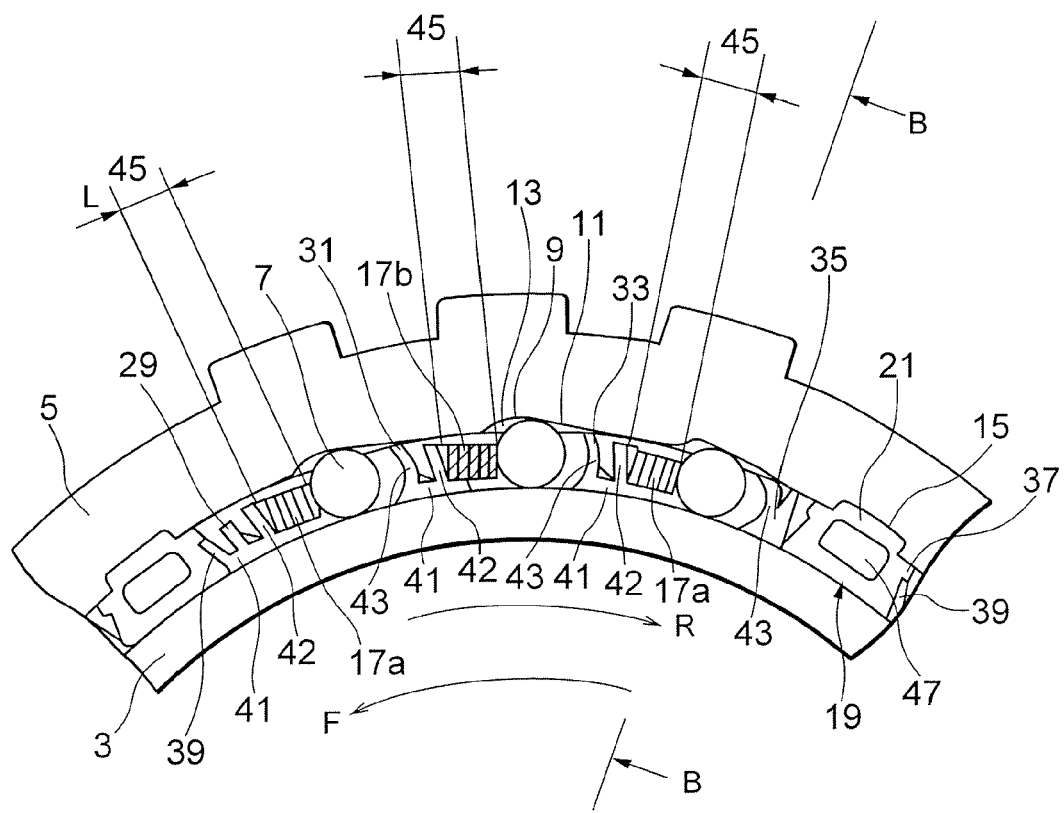
FIG. 2 is an enlarged view showing a portion of the one way clutch shown in FIG. 1.
Figure 3:
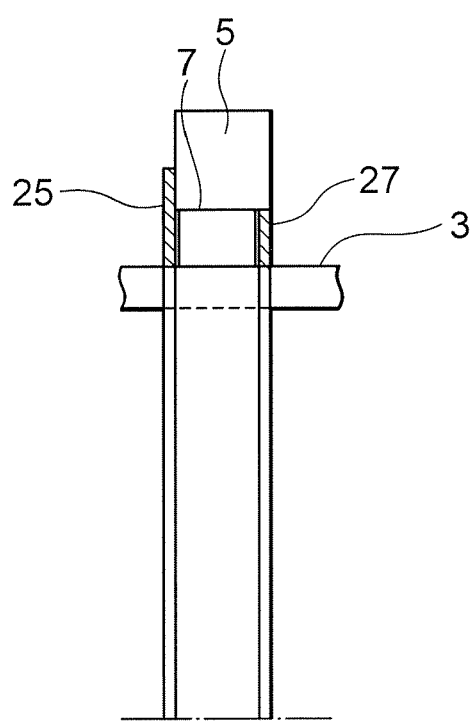
FIG. 3 is a cross sectional view seen from the direction indicated by arrows B in FIG. 2.

A first embodiment of the present invention will be described with reference to the drawings. FIG. 1 is a front view of the first embodiment of the one way clutch according to the present invention. FIG. 2 is an enlarged view showing a portion of the one way clutch shown in FIG. 1. FIG. 3 is a cross sectional view seen from the direction indicated by arrows B in FIG. 2. The one way clutch of this embodiment is to be built in frictional engagement means of an automatic transmission for an automobile, and the overall structure of the automatic transmission is the same as that of the prior art apparatus described before.

As shown in FIGS. 1 and 2, the one way clutch 1 includes a cylindrical inner ring 3 having a smooth outer surface, an annular outer ring 5 that is disposed coaxially with the inner ring 3 and rotatable relative to the inner ring 3, a number of cylindrical rollers 7 that are provided between the inner ring 3 and the outer ring 5 to serve as torque transmission members, and other members. On the inner circumferential surface of the outer ring 5 are a plurality of concave cams 13 provided along the circumferential direction and a plurality of grooves 15 extending along the axial direction. Each concave cam 13 is composed of a recessed portion 9 and a slope 11.

Between the outer circumferential surface of the inner ring 3 and the concave cams 13 are provided the rollers 7 serving as torque transmission members and accordion springs or compression springs 17 that bias the rollers 7 in the concave cams 13 against the slopes 11. The accordion springs 17 include ordinary type accordion springs 17a having a spring constant substantially equal to that of typical springs used in similar types of one way clutches and accordion springs 17b having a spring constant that is 1.2 times higher than that of the accordion springs 17a and having a stronger biasing force. Although in this embodiment use is made of the springs having a spring constant 1.2 times higher than that of typical springs used in similar types of one way clutches, the mode of the present invention is not limited to this particular feature of the embodiment. Any suitable spring having a spring constant 1.2 times or more larger than that of typical springs may also be used.

For example, in this embodiment, there are fifteen accordion springs 17 in total, and ten of them are ordinary type accordion springs 17a, and the other five are accordion springs 17b having a stronger biasing force. The accordion springs 17b are arranged regularly at angular intervals of 72 degrees along the circumferential direction. As per the above, the one way clutch according to this embodiment has fifteen concave cams 13 and fifteen rollers 7.

There are five grooves 15 arranged at angular intervals of 72 degrees at positions different from the concave cams 13 along the circumferential direction on the inner circumferential surface of the outer ring 5. The outer end portion 21 of a block bearing 19 engages with each groove 15. The gap between the inner ring 3 and the outer ring 5 is kept by the block bearings 19. As shown in FIG. 1, the outer ring 5 has engagement projections or teeth 22 provided on the outer circumference thereof. The engagement teeth 22 engage with engagement grooves provided on the inner circumferential surface of a transmission element that is not shown in the drawings.

A retainer 23 made of a synthetic resin is attached on the outer ring 5 in this embodiment. The retainer 23 prevents detachment or dislocation of the rollers 7, the accordion springs 17, and the block bearings 19. As shown in FIG. 3 (which is the B-B cross section in FIG. 2), the retainer 23 is composed of a first annular flange 25 having a larger diameter and a second annular flange 27 having a smaller diameter that extend in the radial direction respectively on different sides of the outer ring 5 with respect to the axial direction and first to fourth columns 29, 31, 33, 35 extending in the axial direction that link the flanges 25 and 27. The first columns 29, the second columns 31, the third columns 33, and the fourth columns 35 are arranged in the mentioned order repetitively along the entire circumference of the retainer 23. The block bearing 19 is disposed and retained between the fourth column 35 and the first column 29. The block bearing 19 has a substantially rectangular through-hole 47 extending along the axial direction of the one way clutch 1.

As shown in FIG. 2, the second column 31 and the third column 33 in this embodiment have the same shape. Each of the first column 29, the second column 31, and the third column 33 has a base portion 41 extending along the inner ring and an accordion spring securing portion 42 extending from the base portion 41 toward the outer ring 5. Each of the second column 31, the third column 33, and the fourth column 35 has a roller retaining portion 43 extending in a direction from the inner ring 3 toward the outer ring 5. The accordion spring 17 is secured by the accordion spring securing portion 42 at one end and presses the roller 7 at the other end. The roller retaining portion 43 prevents detachment of the rollers 7 when the one way clutch is transported as an subassembly with no inner ring 3 being assembled.

Each accordion spring securing portion 42 and the corresponding roller 7 constitute an accordion spring mount portion 45.

In this embodiment, the pitch L of the accordion spring mount portion 45 is substantially equal to a typical pitch of spring mount portion of a retainer commonly used in similar types of one way clutches. In this specification the "pitch" of the accordion spring mount portion is defined as the distance between the accordion spring securing portion and the corresponding torque transmission member in the accordion spring mount portion formed when the torque transmission members are engaging with the inner and outer rings. As shown in FIG. 2, the first column 29 has a lip portion 39, which engages with a projection 37 formed on the outer portion of the block bearing 19.

With the above-described structure, when the inner ring 3 rotates in the direction indicated by arrow R (which indicates the inner ring locking direction) in FIG. 2 relative to the outer ring 5, the accordion springs 17 bias the rollers 7 against the slopes 11 to make the rollers 7, the inner ring 3, and the outer ring 5 integral, whereby transmission of torque is enabled. Arrow F indicates the inner ring idling direction in which the inner ring rotates freely when torque is not transmitted. When the inner ring 3 rotates in the direction indicated by arrow F relative to the outer ring 5, the rollers 7 move away from the slopes 11, while compressing the accordion springs 17, to enter the recessed portions 9, whereby the inner ring 3 is brought into a freely rotating state and transmission of torque is disabled.

In this embodiment, since the accordion springs 17b having a strong biasing force are arranged regularly along the circumferential direction to serve as biasing members, on the occasion of transition from idling of the inner ring to torque transmission even in a very low temperature environment the rollers 7 in the concave cams 13 in which the accordion springs 17b having a strong biasing force are provided are biased by the accordion springs 17b to roll to the respective engagement positions, where the rollers 7 break the oil film to thereby achieve initial engagement reliably. This promotes discharge of oil also in the concave cams 13 in which the ordinary type accordion springs 17a that are commonly used in similar types of one way clutches are provided and facilitates breaking of the oil film. Thus, with the above-described structure, a biasing force that is needed to achieve engagement can be obtained without an increase in the dragging torque in the idle state.

Second Embodiment

Figure 4:
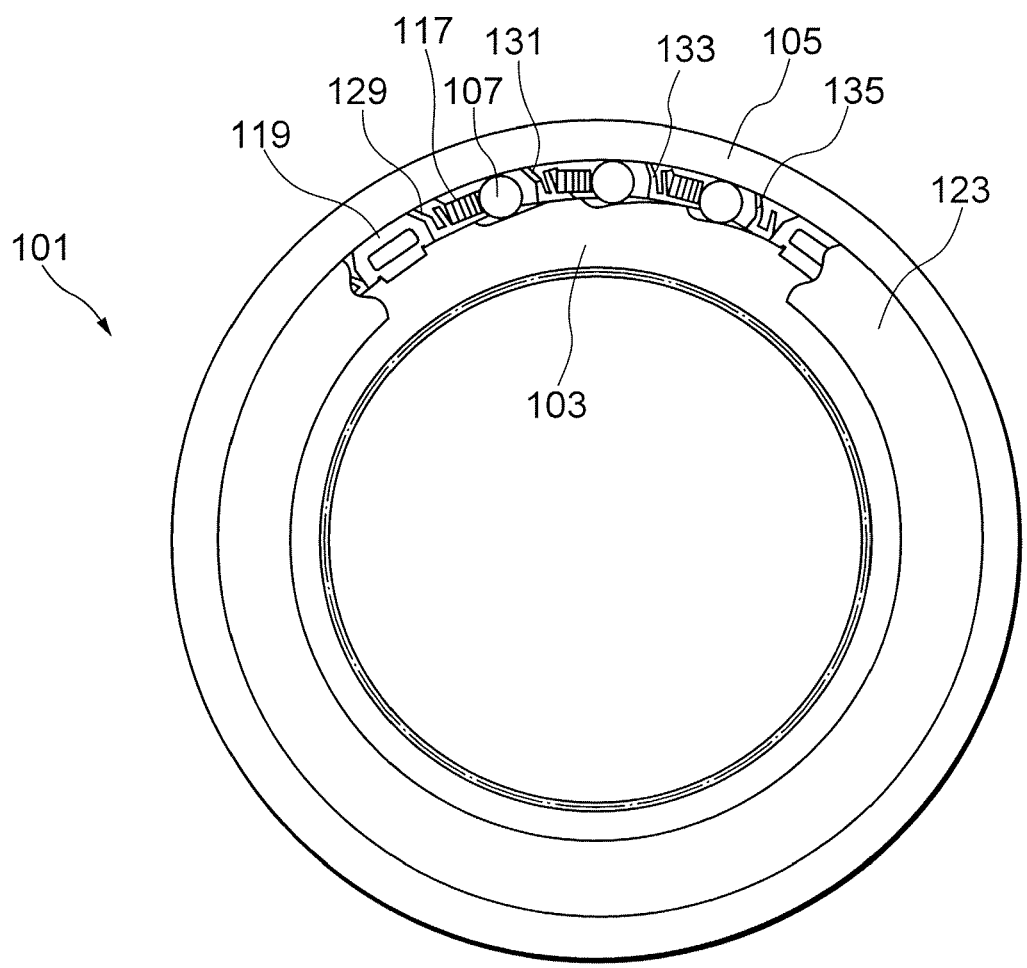
FIG. 4 is a partly cut-away front view of a one way clutch according to a second embodiment of the present invention.
Figure 5:
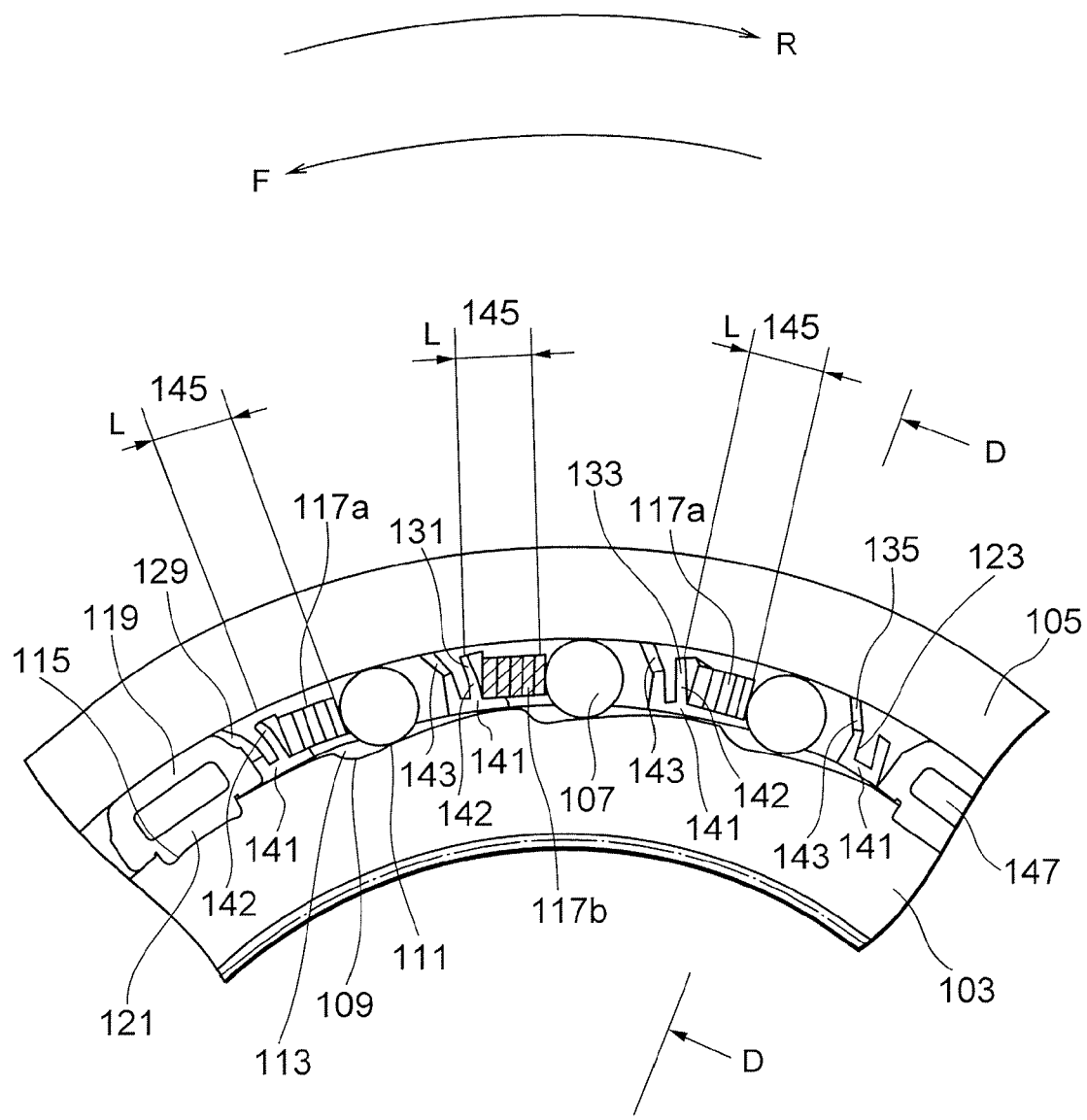
FIG. 5 is an enlarged view showing a portion of the one way clutch shown in FIG. 4.
Figure 6:
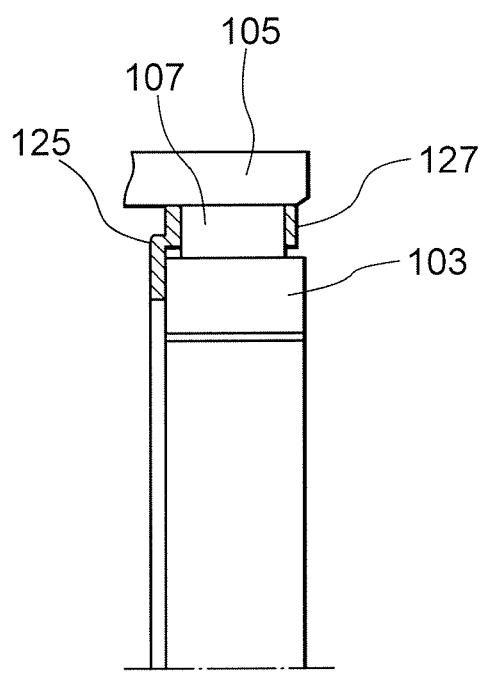
FIG. 6 is a cross sectional view seen from the direction indicated by arrows D in FIG. 5.

In the following, a second embodiment of the present invention will be described. FIG. 4 is a front view of the second embodiment of the one way clutch according to the present invention. FIG. 5 is an enlarged view showing a portion of the one way clutch shown in FIG. 4. FIG. 6 is a cross sectional view seen from the direction indicated by arrows D-D in FIG. 5. The one way clutch of this embodiment is to be built in frictional engagement means of an automatic transmission for an automobile as with the one way clutch according to the first embodiment, and the overall structure of the automatic transmission is the same as that of the prior art apparatus described before.

As shown in FIGS. 4 and 5, the one way clutch 101 includes a cylindrical inner ring 103, an annular outer ring 105 having an smooth inner circumferential surface that is disposed coaxially with the inner ring 103 and rotatable relative to the inner ring 103, a number of cylindrical rollers 107 that are provided between the inner ring 103 and the outer ring 105 to serve as torque transmission members, and other members. On the outer circumferential surface of the inner ring 103 are a plurality of concave cams 113 provided along the circumferential direction and a plurality of grooves 115 extending along the axial direction. Each concave cam 113 is composed of a recessed portion 109 and a slope 111.

Between the inner circumferential surface of the outer ring 105 and the concave cams 113 are provided the rollers 107 serving as torque transmission members and accordion springs or compression springs 117 that bias the rollers 107 in the concave cams 113 against the slopes 111. The accordion springs 117 include ordinary type accordion springs 117a having a spring constant substantially equal to that of typical springs used in similar types of one way clutches and accordion springs 117b having a spring constant that is 1.2 times higher than that of the accordion springs 117a and having a stronger biasing force. Although in this embodiment use is made of the springs having a spring constant 1.2 times higher than that of typical springs used in similar types of one way clutches, the mode of the present invention is not limited to this particular feature of the embodiment. Any suitable springs having a spring constant 1.2 times or more larger than that of typical springs may also be used.

For example, in this embodiment, there are fifteen accordion springs 117 in total, and ten of them are ordinary type accordion springs 117a, and the other five are accordion springs 117b having a stronger biasing force. The accordion springs 117b are arranged regularly at angular intervals of 72 degrees along the circumferential direction. As per the above, the one way clutch according to this embodiment has fifteen concave cams 113 and fifteen rollers 107.

There are five grooves 115 arranged at angular intervals of 72 degrees at positions different from the concave cams 113 along the circumferential direction on the outer circumferential surface of the inner ring 103. The inner end portion 121 of a block bearing 119 engages with each groove 115. The gap between the inner ring 103 and the outer ring 105 is kept by the block bearings 119.

A retainer 123 made of a synthetic resin is attached between the inner ring 103 and the outer ring 105 in this embodiment. The retainer 123 prevents detachment or dislocation of the rollers 107, the accordion springs 117, and the block bearings 119. As shown in FIG. 6, the retainer 123 is composed of a first annular flange 125 and a second annular flange 127 both extending in the radial direction respectively on different sides of the outer ring 105 with respect to the axial direction and first to fourth columns 129, 131, 133, 135 extending in the axial direction that link the flanges 125 and 127. The first columns 129, the second columns 131, the third columns 133, and the fourth columns 135 are arranged in the mentioned order repetitively along the entire circumference of the retainer 123. The block bearing 119 is disposed and retained between the fourth column 135 and the first column 129. The block bearing 119 has a substantially rectangular through-hole 147 extending along the axial direction of the one way clutch 101.

As shown in FIG. 5, the second column 131 and the third column 133 in this embodiment have the same shape. Each of the first column 129, the second column 131, the third column 133, and the fourth column 135 has a base portion 141 extending along the inner ring. Each of the first column 129, the second column 131, and the third column 133 has an accordion spring securing portion 142 extending from the base portion 141 toward the outer ring 105. Each of the second column 131, the third column 133, and the fourth column 135 has a roller retaining portion 143 extending from the base portion 141 toward the outer ring 105. The accordion spring 117 is secured by the accordion spring securing portion 142 at one end and presses the roller 107 at the other end. The roller retaining portion 143 prevents detachment of the rollers 107 when the one way clutch is transported as a subassembly with no outer ring being assembled.

Each accordion spring securing portion 142 and the corresponding roller 107 constitute an accordion spring mount portion 145.

In this embodiment, the pitch L of the accordion spring mount portion 145 is substantially equal to a typical pitch of a spring mount portion of a retainer commonly used in similar types of one way clutches.

With the above-described structure, when the outer ring 105 rotates in the direction indicated by arrow R (which indicates the outer ring locking direction) in FIG. 5 relative to the inner ring 103, the accordion springs 117 bias the rollers 107 against the slopes 111 to make the rollers 107, the inner ring 103, and the outer ring 105 integral, whereby transmission of toque is enabled. Arrow F indicates the outer ring idling direction in which the outer ring rotates freely when torque is not transmitted. When the outer ring 105 rotates in the direction indicated by arrow F relative to the inner ring 103, the rollers 107 move away from the slopes 111, while compressing the accordion springs 117, to enter the recessed portions 109, whereby the outer ring 105 is brought into a freely rotating state and transmission of torque is disabled.

In this embodiment, since the accordion springs 117b having a strong biasing force are arranged regularly along the circumferential direction to serve as biasing members, on the occasion of transition from idling of the outer ring to torque transmission even in a very low temperature environment the rollers 107 in the concave cams 113 in which the accordion springs 117b having a strong biasing force are provided are biased by the accordion springs 117b to roll to the respective engagement positions, where the rollers 107 break the oil film to thereby achieve initial engagement reliably. This promotes discharge of oil also in the concave cams 113 in which the ordinary type accordion springs 117a that are commonly used in similar types of one way clutches are provided and facilitates breaking of the oil film. Thus, with the above-described structure, a biasing force that is needed to achieve engagement can be obtained without an increase in the dragging torque in the idle state.

Third Embodiment

Figure 7:
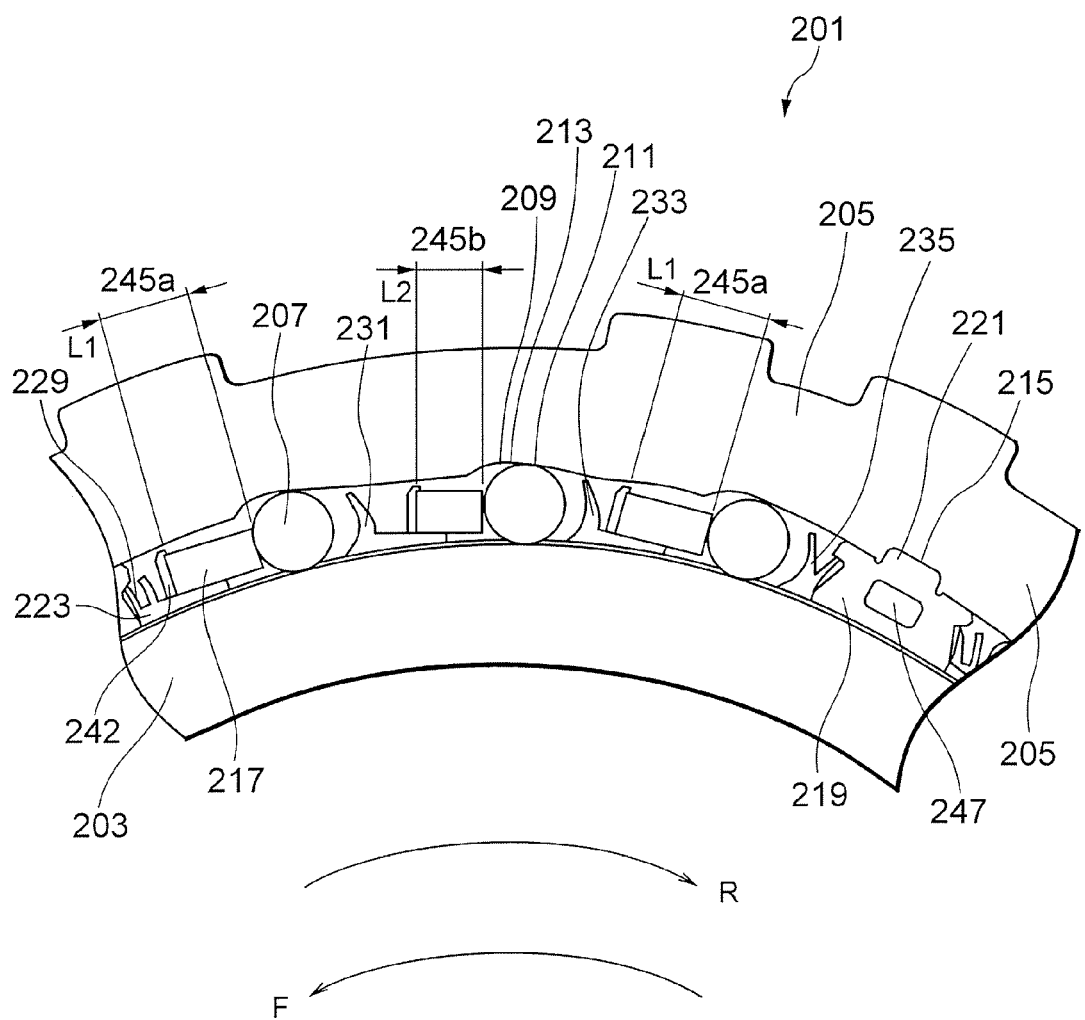
FIG. 7 is a partial enlarged view of a one way clutch according to a third embodiment of the present invention.
Figure 8:
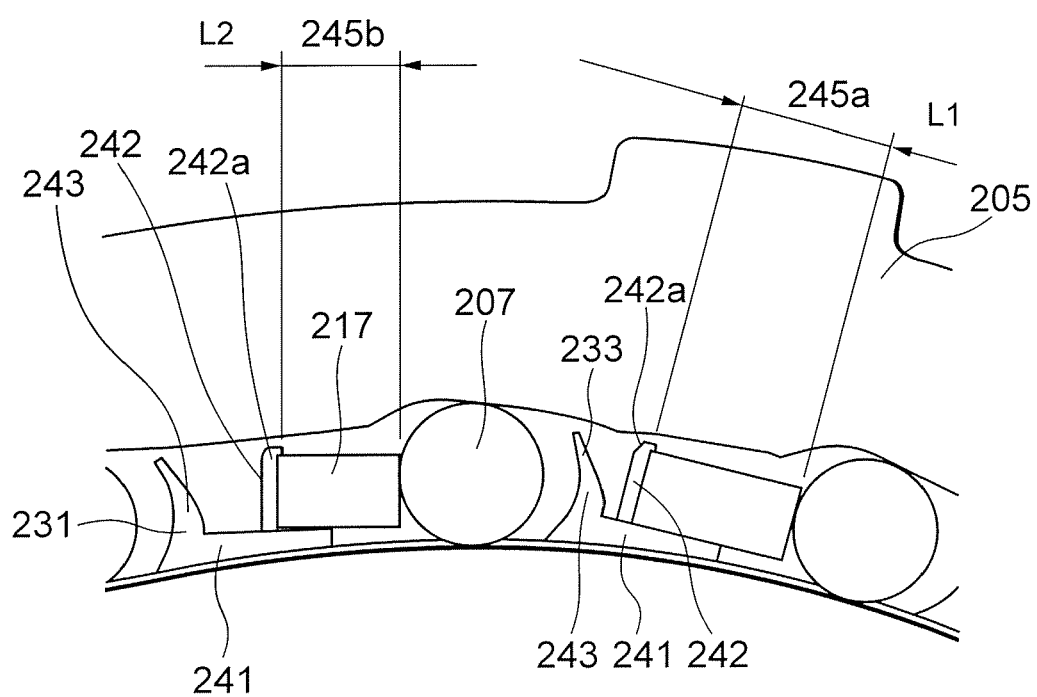
FIG. 8 is a further enlarged view showing a relevant portion of the portion shown in FIG. 7.

In the following a third embodiment of the present invention will be described. FIG. 7 is a partial enlarged view of a one way clutch according to the third embodiment of the present invention. FIG. 8 is a further enlarged view showing a relevant portion of the portion shown in FIG. 7. The one way clutch of this embodiment is also to be built in frictional engagement means of an automatic transmission for an automobile as with those according to the first and second embodiments, and the overall structure of the automatic transmission is the same as that of the prior art apparatus described before.

The one way clutch 201, a part of which is shown in FIG. 7 in an enlarged manner, includes a cylindrical inner ring 203 having a smooth outer surface, an annular outer ring 205 that is disposed coaxially with the inner ring 203 and rotatable relative to the inner ring 203, a number of cylindrical rollers 207 that are provided between the inner ring 3 and the outer ring 205 to serve as torque transmission members, and other members. On the inner circumferential surface of the outer ring 205 are a plurality of concave cams 213 provided along the circumferential direction and a plurality of grooves 215 extending along the axial direction. Each concave cam 213 is composed of a recessed portion 209 and a slope 211. Although in this embodiment the concave cams 213 are provided on the inner circumferential surface of the outer ring 205, the concave cams 213 may be provided on the outer circumferential surface of the inner ring 203, and the inner circumferential surface of the outer ring 205 may be a smooth cylindrical surface.

Between the outer circumferential surface of the inner ring 203 and the concave cams 213 are provided the rollers 207 serving as torque transmission members and accordion springs or compression springs 217 that bias the rollers 207 in the concave cams 213 against the slopes 211. The accordion springs 217 used in this embodiment include only ordinary type accordion springs having a spring constant substantially equal to that of typical springs commonly used in similar types of one way clutches.

The outer end portion 221 of a block bearing 219 engages with each groove 215. The gap between the inner ring 203 and the outer ring 205 is kept by the block bearings 219.

A retainer 223 made of a synthetic resin is attached between the inner ring 203 and the outer ring 205. The retainer 223 prevents detachment or dislocation of the rollers 207, the accordion springs 217, and the block bearings 219. The retainer 223 is composed of a first annular flange and a second annular flange (neither of which is shown in the drawings) that extend in the radial direction respectively on different sides of the outer ring 205 with respect to the axial direction and first to fourth columns 229, 231, 233, 235 that extend in the axial direction. The first columns 229, the second columns 231, the third columns 233, and the fourth columns 235 are arranged in the mentioned order repetitively along the entire circumference of the retainer 223. The block bearing 219 is disposed and retained between the first column 229 and the fourth column 235. The block bearing 219 has a substantially rectangular through-hole 247 extending along the axial direction of the one way clutch 201.

As shown in FIG. 7, the second column 231 and the third column 233 in this embodiment have the same shape. As shown in FIG. 8 in an enlarged manner, each of the second column 231 and the third column 233 having the same shape is composed of a base portion 241 extending along the inner ring, an accordion spring securing portion 242, and a roller retaining portion 243. The accordion spring securing portion 242 and the roller retaining portion 243 extend from the base portion 241 toward the outer ring. The accordion spring 217 is secured by the accordion spring securing portion 242 at one end and presses the roller 207 at the other end. The roller retaining portion 243 prevents detachment of the rollers 207 when the one way clutch is transported as a subassembly with no inner ring being assembled.

The accordion spring securing portion 242 is provided in the vicinity of the roller retaining portion 243. The accordion spring securing potion 242 has an engagement claw 242a for securing and retaining the accordion spring 217 at its end.

Each accordion spring securing portion 242 and the corresponding roller 207 constitute an accordion spring mount portion.

The accordion spring mount portions in this embodiment includes two types which are different in terms of their pitches, one being accordion spring mount portions 245a having a first pitch L1 that is substantially equal to a typical pitch of a spring mount portion of a retainer commonly used in similar types of one way clutches and the other being accordion spring mount portions 245b having a second pitch L2 that is shorter than the first pitch L1. In the accordion spring mount portions 245b, the position of the accordion spring securing portion 242 is shifted along the circumferential direction as compared to the position of the securing portion 242 in the accordion spring mount portions 245a of the other type. The second pitch L2 is designed in such a way that the biasing force exerted on the roller 207 by the accordion spring 217 provided in the accordion spring mount portions 245b will be 1.2 times stronger than the biasing force exerted on the roller 207 by the accordion spring 217 provided in the accordion spring mount portions 245a.

By providing two types of accordion spring mount portions having different pitches, the biasing force that the accordion spring 217 provided in the accordion spring mount portion 245b having the shorter pitch exerts on the corresponding roller 207 can be made stronger than the biasing force that the accordion spring 217 provided in the accordion spring mount portion 245a exerts.

Although in this embodiment, there are two types of accordion spring mount portions including the accordion spring mount portions 245a having an ordinary pitch L1 and the accordion spring mount portions 245b having a pitch L2 shorter than the ordinary pitch L1, there may be provided three or more types of spring mount portions having different pitches. In this embodiment, the pitch L2 of the accordion spring mount portions 245b is designed in such a way that the biasing force exerted on the roller 207 by the accordion spring 217 provided in the accordion spring mount portion 245b is 1.2 times stronger than the biasing force exerted on the roller 207 by the accordion spring 217 provided in the accordion spring mount portion 245a. However, the pitch L2 may be changed to any suitable length with which the biasing force of 1.2 times or more stronger than the biasing force exerted by the accordion spring 217 provided in the accordion spring mount portion 245a is achieved.

For example, in this embodiment, there are fifteen accordion spring mount portions in total, five of them are the accordion spring mount portions 245b having a shorter pitch L2, and the other ten are accordion spring mount portions 245a having an ordinary pitch L1. The accordion spring mount portions 245b are arranged regularly at angular intervals of 72 degrees along the circumferential direction.

Thus, the one way clutch according to this embodiment is provided with fifteen concave cams 213 and fifteen rollers 207. In addition, there are five grooves 215 arranged at angular intervals of 72 degrees on the inner circumferential surface of the outer ring 205 at positions different from the concave cams 213 with respect to the circumferential direction.

With the above-described structure, when the inner ring 203 rotates in the direction indicated by arrow R (which indicates the inner ring locking direction) in FIG. 7 relative to the outer ring 205, the accordion springs 217 bias the rollers 207 against the slopes 211 to make the rollers 207, the inner ring 203, and the outer ring 205 integral, whereby transmission of toque is enabled. Arrow F indicates the inner ring idling direction in which the inner ring rotates freely when torque is not transmitted. When the inner ring 203 rotates in the direction indicated by arrow F relative to the outer ring 205, the rollers 207 move away from the slopes 211, while compressing the accordion springs 217, to enter the recessed portions 209, whereby the inner ring 203 is brought into a freely rotating state and transmission of torque is disabled.

In the third embodiment, since the accordion spring mount portions 245b having a shorter pitch are arranged regularly along the circumferential direction, on the occasion of transition from idling of the inner ring to torque transmission even in a very low temperature environment the rollers 207 are biased by the accordion springs 217 provided in the accordion spring mount portions 245b having a shorter pitch to roll to the respective engagement positions, where the rollers 207 break the oil film to thereby achieve initial engagement reliably. This promotes discharge of oil also in the concave cams 213 having the accordion spring mount portions 245a having a longer pitch and facilitates breaking of the oil film. Thus, with the above-described structure, a biasing force that is needed to achieve engagement can be obtained without an increase in the dragging torque in the idle state.

Although specific embodiments have been described in the foregoing, the modes of the present invention are not limited to these embodiments. For example, although cylindrical rollers are used as the torque transmission members in the above-described embodiment, the rollers may be replaced by sprags or steel balls etc. In this type of one way clutch, the numbers and positions of the ordinary type accordion springs, the accordion springs having a stronger biasing force, the accordion spring mount portions having a different pitch, and the block bearings may be changed suitably according to the use condition. Furthermore, the specific shapes and other features of the retainer, the inner ring, and the outer rings are not limited to those in the above-described embodiments, but they may be modified suitably in accordance with design requirements etc. The one way clutch according to the present invention is advantageous particularly when used in a low temperature environment as compared to conventional one way clutches, but it can also be used in normal environments.

What is claimed is:

1. A one way clutch comprising:
   an inner ring;
   an outer ring disposed coaxially with said inner ring;

a predetermined number of block bearings equi-angular distantly disposed between said inner ring and said outer ring to maintain a space between said inner ring and said outer ring with respect to a radial direction;

first, second and third pairs, each composed of a torque transmission member and a biasing member, disposed circumferentially in order between neighboring two block bearings in the circumferential direction and between an outer circumferential surface of said inner ring and an inner circumferential surface of said outer ring in the radial direction, said torque transmission members being capable of moving between positions at which the torque transmission members engage with the outer circumferential surface of said inner ring and the inner circumferential surface of said outer ring and non torque transmission positions at which the torque transmission members do not engage with the outer circumferential surface of said inner ring or the inner circumferential surface of said outer ring and said biasing members biasing a paired torque transmission member toward the torque-transmission position; and a retainer that retains said pairs of said torque transmission members and said biasing members, said retainer including, between the neighboring two block bearings, first, second, third and fourth retaining portions, wherein the first retaining portion is held by one of the two block bearings, the first retaining portion and the second retaining portion hold therebetween the first pair, the second retaining portion and the third retaining portion hold therebetween the second pair, and the third retaining portion and the fourth retaining portion hold therebetween the third pair, and the fourth retaining portion is held by the other of said neighboring two block bearings, being characterized in that:

the biasing force of the biasing member of said second pair is larger than the biasing force of the biasing members of said first and third pairs, and a distance between said second retaining portion and said third retaining portion is smaller than either of a distance between said first retaining portion and said second retaining portion and between said third retaining portion and said fourth retaining portion, and said biasing members are compression springs having a same spring constant.

2. A one way clutch according to claim 1, wherein a plurality of concave cams each including a recessed portion and a slope are provided on either one of the outer circumferential surface of said inner ring and the inner circumferential surface of said outer ring along a circumferential direction, a cylindrical surface is provided on the other of the outer circumferential surface of said inner ring and the inner circumferential surface of said outer ring, said plurality of torque transmission members are rollers provided respectively between said plurality of concave cams and said cylindrical surface, said biasing members bias said rollers respectively toward said slopes in said concave cams, and said rollers roll in said concave cams by the biasing force of said biasing members only when said inner ring and said outer ring turn in one direction to transmit torque between said inner ring and said outer ring.

3. A one way clutch according to claim 1, wherein there are five said block bearings.

4. A one way clutch comprising:
an inner ring;
an outer ring disposed coaxially with said inner ring;
a predetermined number of block bearings equi-angularly disposed between said inner ring and said outer ring to maintain a space between said inner ring and said outer ring with respect to a radial direction;

between neighboring two block bearings in the circumferential direction and between an outer circumferential surface of said inner ring and an inner circumferential surface of said outer ring in the radial direction are disposed circumferentially a predetermined number of pairs each composed of a torque transmission member and a biasing member, said torque transmission members being capable of moving between positions at which the torque transmission members engage with the outer circumferential surface of said inner ring and the inner circumferential surface of said outer ring and non torque transmission positions at which the torque transmission members do not engage with the outer circumferential surface of said inner ring or the inner circumferential surface of said outer ring, and the biasing members each biasing the paired torque transmission member toward the torque-transmission position; and a retainer that retains said pairs of said torque transmission members and said biasing members, said retainer including, between the neighboring two block bearings, first, second, third, and n-th retaining portions, wherein the first retaining portion is held by one of the two block bearings, neighboring two retaining portions from the first to the n-th retaining portions, respectively, retain said pairs, and the n-th retaining portion is held by the other of said neighboring two block bearings, being characterized in that:

biasing force of the biasing member in an m-th said pair between the neighboring two block bearings in the circumferential direction is larger than that of each of other biasing members between the same neighboring two block bearings, where m and n are integers, m is smaller than n, and n≥4, and a distance between said neighboring two retaining portions retaining said m-th pair is smaller than a distance between said neighboring two retaining portions retaining each of the remaining pairs, and said biasing members are compression springs having a same spring constant.

5. A one way clutch according to claim 4, wherein n=4, m=2.

6. A one way clutch comprising:
an inner ring;
an outer ring disposed coaxially with said inner ring;
a predetermined number of block bearings equiangular distantly disposed between said inner ring and said outer ring to maintain a space between said inner ring and said outer ring with respect to a radial direction;

first, second and third pairs, each composed of a torque transmission member and a biasing member, disposed circumferentially in order between neighboring two block bearings in the circumferential direction and between an outer circumferential surface of said inner ring and an inner circumferential surface of said outer ring in the radial direction, said torque transmission members being capable of moving between positions at which the torque transmission members engage with the outer circumferential surface of said inner ring and the inner circumferential surface of said outer ring and non torque transmission positions at which the torque transmission members do not engage with the outer circumferential surface of said inner ring or the inner circumferential surface of said outer ring and said biasing members biasing a paired torque transmission member toward the torque-transmission position; and a retainer that retains said pairs of said torque transmission members and said biasing members, said retainer including, between the neighboring two block bearings, first, second, third and fourth retaining portions, wherein the first retaining portion is held by one of the two block bearings, the first retaining portion and the second retaining portion hold therebetween the first pair, the second retaining portion and the third retaining portion hold therebetween the second pair, and the third retaining portion and the fourth retaining portion hold therebetween the third pair, and the fourth retaining portion is held by the other of said neighboring two block bearings, being characterized in that:

the biasing force of the biasing member of said second pair is larger than the biasing force of the biasing members of said first and third pairs, and a distance between said second retaining portion and said third retaining portion is smaller than a distance between said first retaining portion and said second retaining portion and between said third retaining portion and said fourth retaining portion, and said biasing members are compression springs having a same spring constant.

* * * * *